(No Model.)
J. P. CALNAN.
TWO WHEELED VEHICLE.
No. 317,925. Patented May 12, 1885.
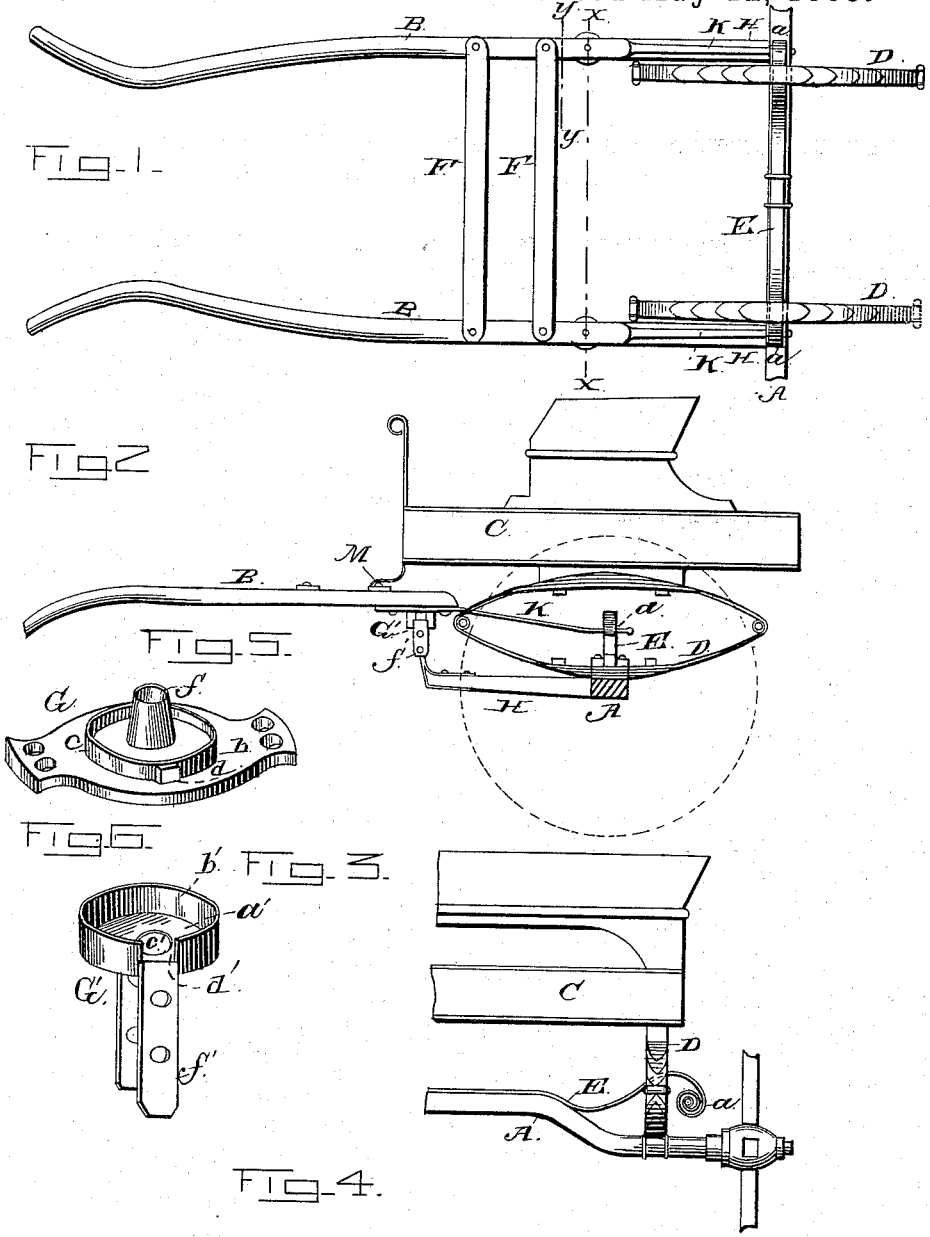

UNITED STATES PATENT OFFICE.

JAMES P. CALNAN, OF CLINTON, IOWA.

TWO-WHEELED VEHICLE.

SPECIFICATION forming part of Letters Patent No. 317,925, dated May 12, 1885.

Application filed August 8, 1884. (No model.)

*To all whom it may concern:*

Be it known that I, JAMES PHILLIP CALNAN, a citizen of the United States of America, residing at Clinton, in the county of Clinton and State of Iowa, have invented certain new and useful Improvements in Two-Wheeled Vehicles, of which the following is a specification, reference being had therein to the accompanying drawings.

My invention relates to two-wheeled vehicles; and it consists of devices constructed, arranged, and combined with the axle, body, and shafts in such manner as to relieve the body of the vehicle from the vertical and lateral motions ordinarily produced by the horse, as hereinafter fully set forth.

In the accompanying drawings, Figure 1 is a plan view of the vehicle with the body and wheels removed. Fig. 2 is a side elevation, with the body attached. Fig. 3 is a partial rear elevation. Fig. 4 is a section on line $x\,x$ of Fig. 1. Figs. 5 and 6 are enlarged perspective views of the devices, detached, which connect the shafts with the axle. Fig. 7 is a section on line $y\,y$ of Fig. 1.

A is the axle.

B designates the shafts.

C is the body, which is mounted upon elliptic springs D, which are securely fastened in any suitable manner to the axle.

E is a scroll-spring terminating at each end in a helical spring, $a$. This spring is arranged lengthwise with the axle, the middle portion of the spring being rigidly attached upon the middle portion of the axle, and the outer portions being extended between the two parts of the elliptic springs, as shown. The thills are connected by one or more cross-bars, F, which are loosely jointed by pivots or otherwise to the thills.

G and G' designate two-part devices employed for connecting the shafts with the arms H, the rear ends of which arms are rigidly attached to the axle or to the springs D. The part G is formed on a plate, $b$, provided with screw or bolt holes for fastening it to the under side of the shafts, and with an annular flange, $c$, lug $d$, and socket $f$. The part G' consists of a disk, $a'$, having an upwardly-extended collar, $b'$, to receive the flange $c$, a central hole, $c'$, to receive the end of the socket $f$, and a notch, $d'$, to receive the lug $d$, and downwardly-extended jaws $f'$, provided with bolt-holes. To the rear portions of the thills are attached iron arms K, the ends of which are extended through the coil ends $a$ of the spring E.

L designates irons, the lower portions of which are attached to the forward ends of the arms H, and the upper portions, formed to extend upward between the jaws $f'$, are provided with eyes to receive the bolts extended through the holes in the jaws, thus connecting the thills with the axle.

M designates one or more stay-straps attached to the front of the body and to one of the cross-bars.

It is evident that the body may be attached to the vehicle in any suitable manner other than that herein set forth without departing from or affecting the principle of my invention.

It will be readily seen that the connecting-bars F, loosely jointed or pivoted to the thills, the two-part connecting-irons G and G', the extended arms K, and helical springs E $a\,a$ are all constructed with the view of allowing lateral motion of the thills without imparting oscillatory motion to the axle or body. The lugs $d$ on the part G being smaller than the notch $d'$ in the part G, and the parts being loosely fitted together, allow oscillatory motion of the parts, and the helical springs allow the requisite lateral and vertical motion imparted to the shafts without imparting either motion to the body. The stay-straps M being of suitable lengths to be loose when the weight of the rider or riders is upon the body, the vertical motion of the shafts, caused by the movements of the horse, will not be imparted to the body, while at the same time the straps hold the body against a tilting motion, which otherwise would be caused by irregular and violent movements of the vehicle.

Having described my invention, I claim—

1. The combination, with the axle A, and the helical springs $a\,a$, attached to the axle and constructed to yield laterally and vertically, of the shafts B, the arms H, connecting the shafts with the axle, and the arms K, attached to the shafts and extended through the helical springs, substantially as and for the purposes described.

2. In a two-wheeled vehicle, the combination, with the axle A, arms H, and connecting-irons L, of the shafts B, and two-part connecting-irons G G', constructed to allow oscillatory motion of the shafts, substantially as set forth.

3. In a two-wheeled vehicle, the shafts B, connected by one or more cross-bars, F, pivoted or otherwise loosely jointed to the shafts, in combination with the two-part connecting-irons G G', axle A, arms H and K, and helical springs *a a*, substantially as and for the purposes set forth.

In testimony whereof I hereto affix my signature in presence of two witnesses.

JAMES P. CALNAN.

Witnesses:
   C. W. CHASE,
   A. H. PADDOCK.